Dec. 18, 1934.    J. W. JACKSON    1,984,681
AUTO PENTHOUSE
Filed Jan. 10, 1934    3 Sheets-Sheet 1
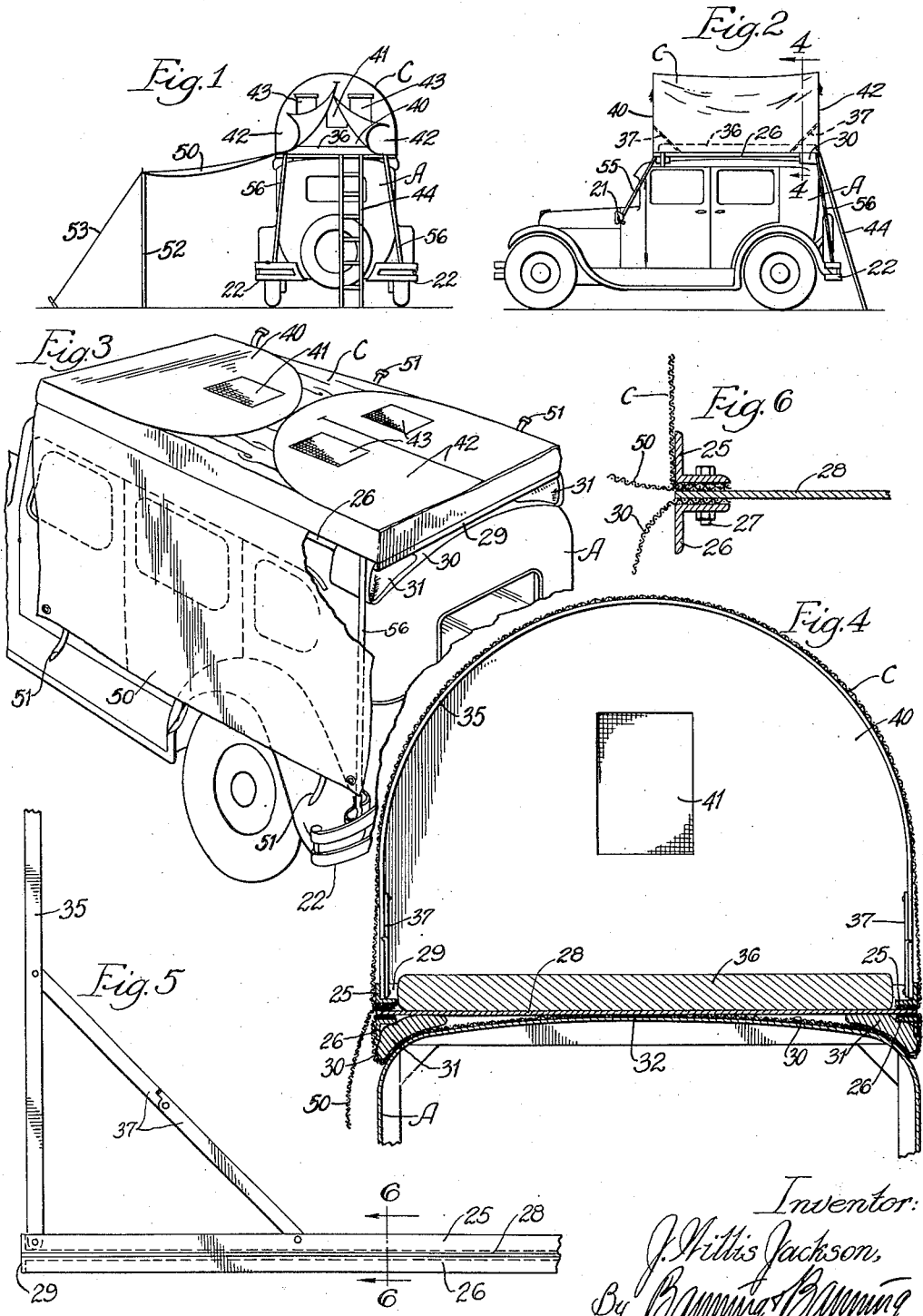

Dec. 18, 1934.   J. W. JACKSON   1,984,681
AUTO PENTHOUSE
Filed Jan. 10, 1934   3 Sheets-Sheet 2
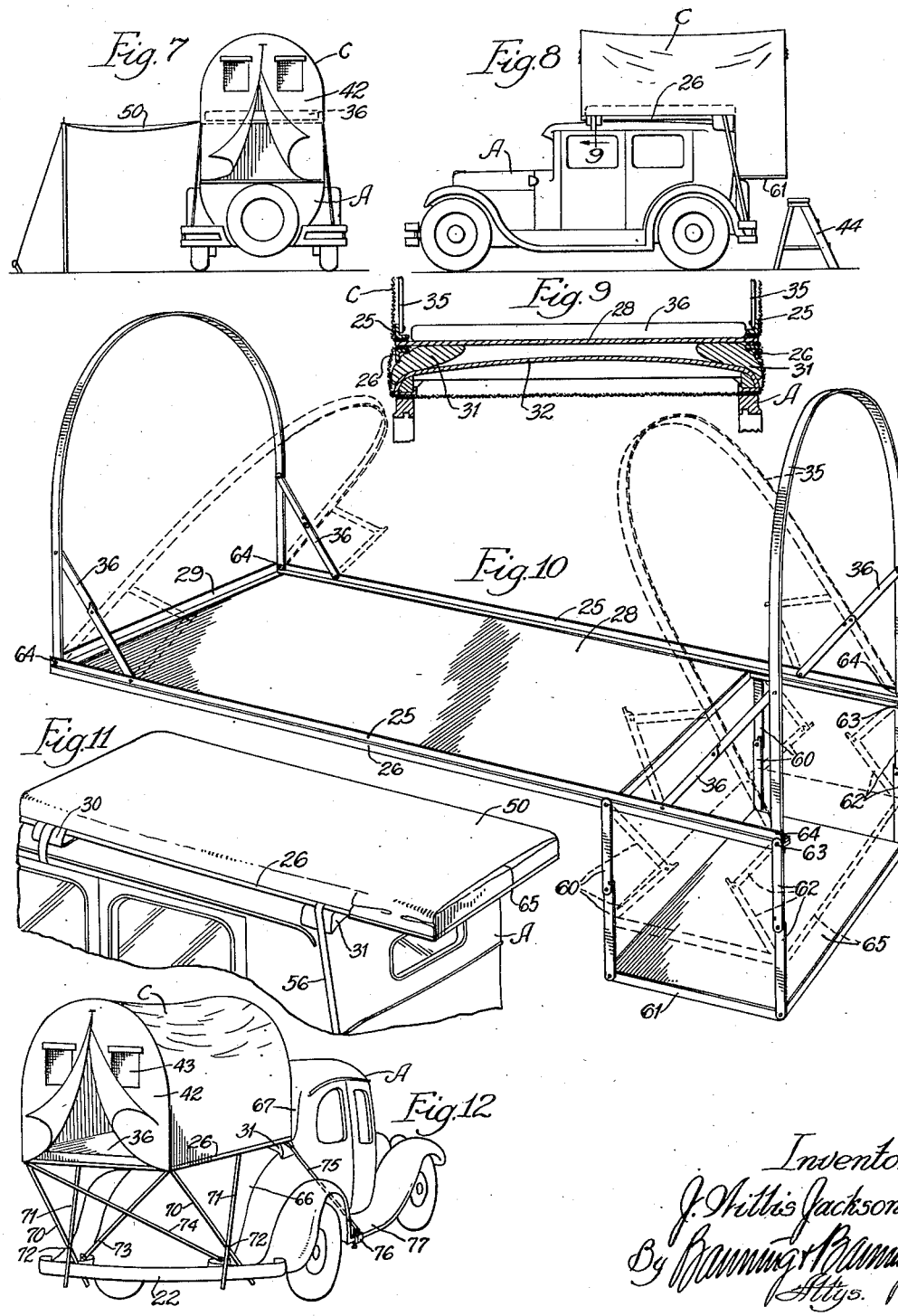

Dec. 18, 1934.  J. W. JACKSON  1,984,681
AUTO PENTHOUSE
Filed Jan. 10, 1934  3 Sheets-Sheet 3
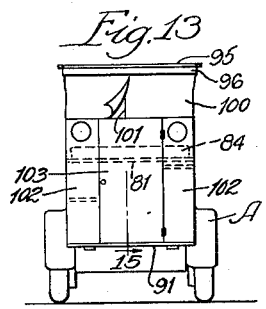
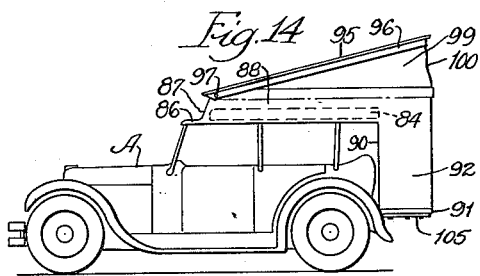
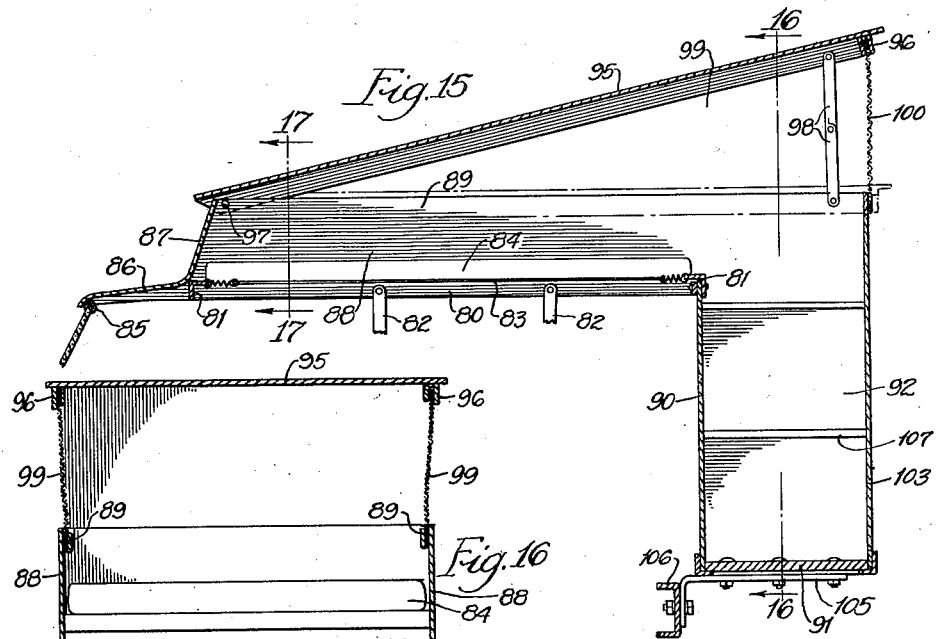
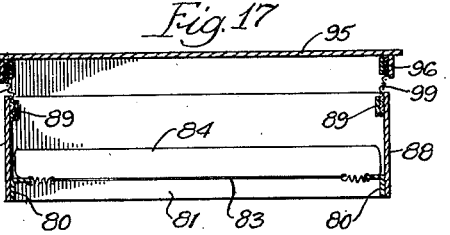
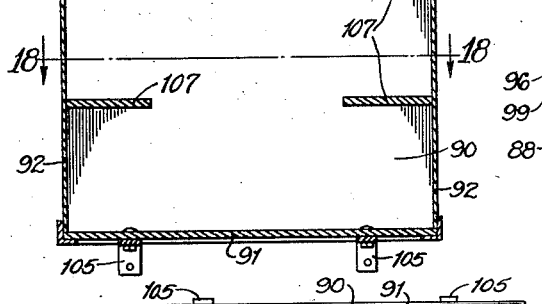
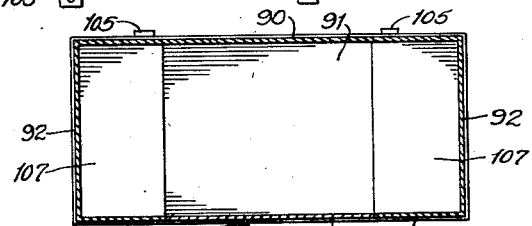

Patented Dec. 18, 1934

1,984,681

UNITED STATES PATENT OFFICE 1,984,681

AUTO PENTHOUSE

John Willis Jackson, Winnetka, Ill.

Application January 10, 1934, Serial No. 706,026

17 Claims. (Cl. 135—4)

This invention relates to an auto penthouse adapted for mounting on the top of an automobile. I aim by the improvements herein described to provide sleeping, and optionally dressing, accommodations in a structure which is light, which is attachable in place without special fittings, which may be collapsed or folded down into small compass, and which is spacious and conveniently accessible for use. An auto penthouse having these advantages may be variously constructed, certain suggestive embodiments thereof being exhibited in the accompanying drawings in the manner following:

Figure 1 is a view in elevation toward the rear end of an automobile whereon is an erected auto penthouse together with a shelter or canopy extending laterally therefrom;

Fig. 2 is a side elevation of the automobile showing the auto penthouse erected;

Fig. 3 is a perspective view of the automobile body with the auto penthouse collapsed and folded down thereupon;

Fig. 4 is an enlarged transverse section through the auto penthouse on line 4—4 of Fig. 2;

Fig. 5 is a fragmentary detail of one end of the supporting frame for the auto penthouse;

Fig. 6 is a detail in section on line 6—6 of Fig. 5;

Fig. 7 which is a view similar to Fig. 1 shows the auto penthouse modified to the extent of incorporating a dressing compartment at the rear end thereof;

Fig. 8 is a side elevation of an automobile showing the auto penthouse of Fig. 7 erected for use;

Fig. 9 is an enlarged detail in transverse section taken on line 9—9 of Fig. 8;

Fig. 10 is a perspective view of the frame for the auto penthouse shown in Figs. 7 and 8;

Fig. 11 is a view in perspective of the same auto penthouse collapsed and folded down upon the automobile top in the condition for traveling;

Fig. 12 shows in perspective an auto penthouse similar to that of Figs. 1 and 2 having a mounting which adapts it for a coupé or roadster style of automobile body;

Fig. 13 is a view in elevation looking toward the rear end of an auto penthouse of relatively rigid construction;

Fig. 14 which is a side elevation illustrates the auto penthouse of Fig. 13 applied to an open or touring style of automobile body;

Fig. 15 is a central vertical section through the auto penthouse taken on line 15 of Fig. 13;

Fig. 16 is a transverse vertical section taken on line 16 of Fig. 15;

Fig. 17 is a transverse section taken on line 17—17 of Fig. 15; and

Fig. 18 is a horizontal section taken on line 18—18 of Fig. 16.

The automobile body illustrated in various figures of the drawings is denoted by the reference character A. It is customarily provided with certain fittings, such as cowl lights 21, rear bumpers or bumperettes 22, a spare tire, side mounts, headlights, etc. It is with an automobile body having these general features of construction that the present penthouse is adapted to be used.

Referring now to Figs. 4 and 5, I have shown an auto penthouse built around a framework which may comprise certain bars or rails suitably joined for erection or collapse, according as the auto penthouse is to be set up or taken down. For this purpose, I may employ a pair of base rails 25 extending lengthwise of the auto penthouse, one along each side thereof, together with a second pair of subrails 26. These several rails, if made of metal, are desirably of angle form with bolt connections 27 extending through adjacent flanges. Between these connected flanges is supported a floor which optionally may consist of a plywood board 28. If desired, the framework may include other rails 29 connecting the base rails at the front and rear ends thereof.

Clamped between the two sets of base and subbase rails, near each end of the frame, is a wide strip 30 which passes around and under the floor. A pair of cushions 31 is placed between the board and strip, one adjacent each of the under rails, where they tend normally to remain in place. These cushions, of which four are used in the illustrated construction, form a pad adapted to rest upon the automobile top 32 at the rounded edges adjacent the sides thereof. The angle rails 25 and 26 are so disposed as to present in each instance an outer vertical flange with the inner horizontal flanges in adjacent relation. Accordingly each subrail is faced toward the cushions which engage therewith, thereby affording a maximum of space between the rails and automobile top for accommodation of the cushions which remain positioned immediately over the sides of the automobile body. In this way the load is sustained principally, if not entirely, by the automobile sides and not by its top which usually lacks any reinforcement or bracing which would fit it for such service.

Pivotally joined to the base rails adjacent each end thereof is a swinging bow 35. These bows may be folded down upon a mattress 36 which is rested upon the floor 28 or the bows may be swung to upright position where they are held by pivoted links 37 forming a collapsible brace. When erected, the bows provide a framework for sustaining a fabric cover C which is desirably waterproofed. The cover extends over the top of the framework and down along the opposite sides thereof where it is fastened as by insertion between the floor and base rail.

At the forward end of the enclosure thus defined by the framework and cover, I provide a curtain of waterproofed material forming an end wall 40 having therein, by preference, a window 41. Similarly I provide at the rear end of the enclosure a wall formed, by preference, of two similar curtains 42, each having a window opening 43. These curtains which overlap at the vertical center of the rear wall are adapted to be buttoned or otherwise fastened so as to complete the enclosure for the auto penthouse. When disconnected and pushed back, as shown in Fig. 1, they afford an opening through which access to the auto penthouse may be gained. If desired, a light portable ladder 44 may be set up at the rear end of the automobile to facilitate movements into and out of the penthouse. The length of this ladder is desirably such as to about correspond with that of the penthouse for convenience in accommodation when the latter is collapsed or folded down.

The fabric covering C is, by preference, connected with the front and rear curtains so as to form, in effect, a continuous piece of material. Additionally the covering is fastened to the two bows so that the end curtains remain stretched thereupon at all times. When it is desired to collapse or fold down the penthouse, the braces sustaining the end bows are operated to yielding position permitting the bows to fold inwardly. During this movement the covering material may be folded in to lie beneath the bows and over the mattress, as suggested in Fig. 3. It is desirable that the width of the bows be a trifle less than the length of the base rails, so that the bows may swing inwardly to down positions without overlapping. To protect the auto penthouse when folded down, I may employ a cover 50 one edge of which is secured in place adjacent the base rails 25. This cover is adapted to be carried across over the collapsed auto penthouse, and over luggage or other equipment which is supported thereupon, and its free edge may then be secured down in place as by means of strap and buckle connections 51. The cover so provided will furnish adequate protection to the collapsed auto penthouse and will not work loose even when the automobile be driven at high speed. With the auto penthouse erected, as suggested in Fig. 1, the cover may be extended out laterally with its free edge supported by poles 52, guy ropes 53 being employed to sustain the cover in the position shown. In this manner I can set up very quickly and easily a shelter alongside the automobile.

An auto penthouse of the kind described may be mounted directly upon the top of an ordinary automobile body without damage or injury thereto. This is possible because of the elevated support furnished for the base rails at the corners by means of the cushions 31 which sustain practically the entire load. To secure the penthouse against shifting movement upon the automobile top it is unnecessary to resort to special fittings. Adequate anchorage is afforded as by means of webbing or strap connections 55 extending from the front corners of the framework to any exposed fitting at the front of the automobile, such, for example, as the cowl lights 21 shown in Fig. 2. A similar set of connections 56 may extend from the rear end of the auto penthouse to other fittings upon the automobile, such, for example, as the bumperettes 22. The positioning against the rounded edges of the sides of the top of cushions which are confined in place by the strip 30 prevents transverse shifting of the auto penthouse upon the car roof. Accordingly the entire structure, when anchored in the manner described, may be depended upon to remain stationary without any attention, under all ordinary conditions of travel.

In Figures 7 to 11 inclusive, I have suggested a modification in the auto penthouse to the extent of extending the base and subbase rails rearwardly to a point which overhangs considerably the rear end of the automobile body to which the structure is applied. Depending from the rear ends of the subbase rails are pivoted links 60 supporting at their lower ends a pair of horizontal bars 61 which at their rear ends are joined to pivoted links 62 which have pivotal connection at 63 with the rear ends of the subbase rails. The rear bow 35 is also pivoted at 64 to the rear end of the base rails, and is provided with folding braces 36, the same as is the other bow 35 at the forward end of the structure. A platform 65 extends between the two horizontal bars 61, as shown.

The auto penthouse frame just described is collapsible the same as is the construction already described. The rear bow may swing down into substantially horizontal position upon a mattress 36, and in so doing it will execute a movement as suggested by the dotted lines in Fig. 10. The links 60 and 62 are foldable toward each other so as to occupy horizontal positions, in consequence of which the platform 65 is elevated to a point substantially even with the base rails.

In the erected condition, as suggested in Figs. 7 and 8, the platform at the rear end of the auto penthouse is positioned at a point considerably below the roof of the automobile, permitting one to mount thereupon with the aid of a small ladder. The proportions may be such that an occupant will have full head-room for dressing when standing upon the platform. The entire framework is, of course, provided with a covering and front and rear curtains substantially the same as already described.

When the structure is collapsed or folded down, it will occupy a position on the automobile roof about as indicated in Fig. 11. Here it will be noted the rear end of the collapsed auto penthouse is shown as extending out somewhat beyond the corresponding end of the automobile body, due to the added length of the platform extension.

The auto penthouse of my invention may be mounted upon an automobile body other than as described in connection with Figs. 1 to 11. An example of another form of mounting is given in Fig. 12 wherein I have shown an auto penthouse the same as in Figs. 1 and 2 supported upon a coupé or roadster type of body over the rear deck portion thereof. In this form of mounting, the cushions 31 are arranged only at the forward end of the auto penthouse adjacent opposite sides of the rear deck 66 to protect the automobile body at such points. The cushions are desirably extended around to lie in part in front of the auto penthouse so as to furnish a stop against shifting of the auto penthouse toward the rear wall 67 of the body enclosure. To support the rear end of the auto penthouse, it may be convenient to use a pair of struts 70 and 71 pivotally and adjustably connected as at 72 toward their lower ends. The upper end of the strut 70 is joined to the rear end of one of the base rails 25 and the corresponding end of the other strut 71 is joined to the same rail at a point intermediately of its two ends. A pair of such struts, one depending from each base rail of the auto penthouse, is adapted to rest upon a rear fitting of the automobile, such as the bumper 22. By reason of the crossing of the two struts in each pair, I provide, in effect, a scissors formation the lower components of which are adapted to straddle the bumper whereby to obtain a firm support thereupon. To prevent lateral shifting of the rear end of the auto penthouse I may use other cross struts, cables or straps 73 and 74 each extending from one rear corner of the auto penthouse frame to a point near the remote end of the bumper with which it engages. To hold the auto penthouse closely adjacent the rear wall 67 of the body enclosure, a webbing or strap 75 is extended from the forward ends of each base rail downwardly and forwardly to connect with a clamp 76 that is affixed to the running board 77. Experience has demonstrated that such a mounting for the auto penthouse will meet all the usual requirements of service.

Referring now to the construction illustrated in Figs. 13 to 18 inclusive, I have here shown a construction of auto penthouse having a rear extension to afford a depending platform much the same is is illustrated in Figs. 7 and 8. In this case, however, the auto penthouse is shown as applied to a touring car from which the top is removed, and the construction is of a relatively rigid type with provision for only partial collapse.

A rectangular framework is used, consisting of angle iron rails 80 extending along the sides, and other rails 81 extending across the ends, the sides of the frame being substantially in line with the sides of the body. Such a frame is supported in place upon the body as by struts 82 which connect the side rails 80 to any convenient fittings upon the body. Also supported by the frame and extending between the four rails thereof is a wire or link spring floor 83 upon which may be rested a mattress 84.

The front rail 81 may, if desired, be positioned slightly to the rear of the wind shield head 85. In such case I provide a cowl piece 86 which extends from a point just forwardly of the wind shield head rearwardly to the front rail 81 and thence upwardly to form a sloping front wall 87 for the auto penthouse enclosure. Side walls 88 extend from the front wall rearwardly past the rear rail 81, being reinforced along their top edges as by cleats 89. Below the rear rail 81 is extended a rear wall 90 which drops down below the rear body wall of the automobile in adjacent relation thereto to support a platform 91 which at its two ends is enclosed by walls 92 which extend upwardly to join with the side walls 88. As suggested in the drawings, the depending side walls 92 may be integral with the longitudinally extending side walls 88, and it will be found convenient and advantageous to use for such walls some light composition board material such as is now available for building purposes or otherwise.

The roof of the auto-penthouse is provided by a further board 95 reinforced along its side and rear edges by cleats 96, the forward end of the roof being pivotally joined at 97 to the forward end of the side walls 88 adjacent an upper edge thereof. When the auto penthouse is to be occupied, the roof may be swung upwardly at its rear end, as shown in the drawings, being sustained in this position by foldable braces 98. Extending down from the roof to join with the upper edges of the side walls 88 are curtains 99 which extend around upon the rear side of the auto penthouse as at 100. If desired, these curtains may be split at 101 (see Fig. 13) to facilitate entrance into the auto penthouse.

A partial enclosure for the platform extension is furnished by rear walls 102, one extending inwardly from opposite ends thereof to leave a central opening closable by a door 103. The platform extension may be further supported, if desired, by a brace 105 which extends from a position below the platform forwardly to connect with a cross piece or other convenient body part 106 to be found adjacent the rear end of the automobile.

In the construction of the rigid type of auto penthouse illustrated in Figs. 13 to 18 inclusive, elevation of the roof at its rear end is all that is required to render the construction suitable for occupancy. There is ample room beneath the roof for persons to stand upon the platform extension and also to lie down upon a full size mattress that is supported over the car body. Suitable windows for ventilation may be provided as suggested in Fig. 13 and other fittings 107 for convenience, such as shelves, a dressing table, a seat, etc., may be provided in the rear extension, as shown in Fig. 16. Here may be accommodated a stove, refrigerator, toilet, luggage, and various supplies and equipment. While it is not necessary that the roof be dropped in order that the car may proceed on its way, nevertheless it minimizes wind resistance and lowers somewhat the center of gravity, so it may be desirable to do so.

From the foregoing description, it will be observed that the auto penthouse of my invention is characterized by a ready adaptability for mounting upon an automobile body, by ease and facility with which it may be erected for occupancy and be taken down again for collapse to minimum size, by the adequacy and spaciousness of the accommodations afforded both for sleeping and dressing purposes, and by the proportions and dimensions of its several parts all of which may be disposed within the confines of the folded-down structure. In addition the covering which furnishes protection to the auto penthouse in folded down condition serves admirably to furnish a shelter alongside of the automobile giving the occupants full opportunity to be protected against the elements when resting, cooking or eating in the open. The present penthouse which may be produced at small expense will furnish all needful facilities for those who desire to carry along their own sleeping and dressing quarters when en tour.

I claim:

1. For use with a vehicle body, a surmounting auto penthouse comprising a base, means for anchoring the base in a fixed position on top of the vehicle body, a pair of bows pivotally mounted on the base adjacent opposite ends thereof, each adapted to swing inwardly and downwardly to a position of collapse or to swing upwardly and vertically into a position of erection, and adapted to support a flexible covering providing an enclosure above the base, and means for releasably sustaining the bows in erected position.

2. For use with a vehicle body, a surmounting auto penthouse comprising a base, a floor affixed to the base, a strip extending beneath the base, cushions secured in place by the strip and positioned between the base and the top of the vehicle body, means for anchoring the base fixedly upon the top of the body, a pair of bows pivotally mounted upon the frame adjacent opposite ends thereof, each adapted to swing upwardly into erected vertical position, and adapted to support a flexible covering providing an enclosure above the base, and means for releasably sustaining the bows in erected position.

3. For use with a vehicle body, a surmounting auto penthouse comprising a base, a floor carried by the base adapted to sustain a mattress, a pair of bows pivotally mounted upon the base adjacent opposite ends thereof, each adapted to swing inwardly and down upon the mattress, and adapted to support a flexible covering providing an enclosure above the base, the bows being of such size with their pivotal mountings so spaced as not to overlap when swung to down position upon the mattress, and means for releasably sustaining the bows in upright position when swung upwardly to positions of erection.

4. For use with a vehicle body having fixedly secured exterior fittings, a surmounting auto penthouse adapted for attachment thereto or removal therefrom, comprising a pair of bows adapted to support a flexible covering, rails extending between the two bows furnishing spaced pivotal supports therefor, means for connecting the bows and rails for releasably sustaining the bows in upright erected position, and connections extending from the rails to the fittings exteriorly of the vehicle body whereby to anchor the rails and bows in a fixed position upon the vehicle top.

5. For use with a vehicle body, a surmounting auto penthouse adapted for attachment thereto or removal therefrom, comprising a floor adapted for positioning over the vehicle top, rails connected to the opposite sides of the floor, cushions interposed between the rails and floor and opposite edges of the vehicle top whereby to sustain the penthouse thereupon, means for supporting the cushions in place upon the under side of the rails and floor, a pair of bows pivotally carried by the rails, one adjacent each end thereof, the bows being adapted to swing from vertical upright positions downwardly into adjacent relation with the floor, and adapted to support a flexible covering providing an enclosure above the floor, and means for releasably sustaining the bows in upright position.

6. For use with a vehicle body, a surmounting auto penthouse adapted for attachment thereto or removal therefrom, comprising a base including side rails adapted for positioning adjacent the sides of an automobile top, means for securing the base immovably upon the automobile top, the rear ends of the side rails being extended rearwardly of the automobile top to protrude therebeyond, a pair of bows pivoted to the side rails one adjacent each end thereof, a support depending from the side rails below the automobile top along the rear of the body, a platform carried by said depending support at a point below the automobile top, and means for releasably sustaining the bows in upright position, the bows being adapted to support a flexible covering which defines an enclosure above the base and for the depending platform whereby to provide a dressing compartment for a standing occupant at the rear of the vehicle body.

7. For use with a vehicle body, a surmounting auto penthouse comprising a base extending in part beyond the rear of the body, means for anchoring the base in position upon the roof of the vehicle body, a pair of bows pivotally mounted upon the base adjacent opposite ends thereof, each adapted to swing inwardly and downwardly to positions of collapse or to swing upwardly into upright erected positions, and adapted to support a flexible covering providing an enclosure above the base, means for releasably sustaining the bows in upright position, a support depending from the frame to the rear of the vehicle body, and a platform carried by said depending support affording in conjunction with the enclosure thereabove a dressing platform for an occupant standing thereupon.

8. For use with a vehicle body, a surmounting auto penthouse comprising a base extending in part beyond the rear of the vehicle body, means for anchoring the base fixedly upon the roof of the vehicle body, a pair of bows pivotally mounted upon the base adjacent opposite ends thereof, each adapted to swing inwardly and down to collapsed positions or to swing upwardly into upright erected positions, a collapsible support depending from the base at the rear end thereof and to the rear of the vehicle body, a platform linked to the support and adapted to be sustained at an elevation below the vehicle roof or to be raised to a point at substantially the same level therewith, means for releasably sustaining the bows in upright position, the bows being adapted to support a flexible covering extending down to the platform whereby to provide an enclosure therefor.

9. For use with a vehicle body, a surmounting auto penthouse comprising a floor, longitudinal side rails connected with opposite edges of the floor, a pair of swinging bows mounted at opposite ends of the longitudinal rails adapted to swing down to collapsed positions or to swing up to erected positions, and adapted to support a flexible covering to provide an enclosure above the floor, means for releasably sustaining the bows in upright position, cushions interposed between the longitudinal rails and the roof portion of the vehicle body whereon the penthouse is mounted, flexible connections extending from the rails to forward points upon the automobile body, and other connections in opposition thereto extending from the rails to points associated with the rear end of the automobile body, the two sets of connections cooperating to sustain the penthouse fixedly in position against shifting movements.

10. For use with a vehicle body, a surmounting auto penthouse comprising a floor, side and end walls, and a roof, means for fixedly anchoring the penthouse in position over the vehicle body, the penthouse being extended rearwardly beyond the corresponding end of the body and then downwardly upon the rear side of the body to terminate in a platform, the side walls of the penthouse being extended down to enclose the platform extension at opposite ends thereof.

11. For use with a vehicle body, a surmounting auto penthouse arranged over the body and fixedly anchored in place thereupon, the penthouse comprising a floor, side and end walls, and a collapsible roof having releasable means for sustaining it normally in raised position, and the penthouse being extended rearwardly past the corresponding end of the body and then downwardly thereupon to terminate in a platform, the sides of the penthouse being likewise carried along the platform extension to provide enclosures at opposite ends thereof.

12. For use with a vehicle body, a surmounting auto penthouse arranged over the body and fixedly secured thereto, the penthouse comprising a floor, side and end walls, a roof, and a depending extension located to the rear of the vehicle body and terminating in a platform, and means providing an openable closure at the rear of the platform extension.

13. For use with a vehicle body, a surmounting auto penthouse arranged over the body and fixedly secured thereto, the penthouse comprising a floor, side and end walls, a rearward extension depending upon the rear side of the body and terminating in a platform, and a roof of rigid construction pivoted adjacent one edge to a wall of the penthouse and adapted to be swung from a horizontal to a slanting position relative to the floor thereof, and flexible wall coverings connecting the roof with the proximate walls of the penthouse.

14. For use with a vehicle body, a surmounting auto penthouse arranged over the body and fixedly anchored thereto, the penthouse comprising a floor, a front and opposite side walls, and a roof which is pivoted adjacent its front end to the walls permitting the rear end of the roof to raise and lower, and flexible wall coverings connecting the roof with the adjacent walls of the penthouse.

15. An auto penthouse surmounting a vehicle body comprising a base supporting a collapsible enclosure which extends in part rearwardly of and down upon the corresponding end of the vehicle body, the enclosure when collapsed moving vertically toward the base from above and below, and a cover secured along one edge to the base and extensible laterally therefrom to afford a shelter alongside and exteriorly of the vehicle body, the cover being movable to and securable in a positon over the collapsed enclosure to provide protection therefor.

16. An auto penthouse surmounting a vehicle body comprising a base supporting a floor and a frame to which is fitted a flexible covering providing an enclosure having capacity for collapse upon the base, the frame and covering including a depending extension rearwardly of the vehicle body together with a platform supported at a point of relatively low elevation to provide an enclosed space for a standing occupant.

17. For use with a vehicle body having a top the edges of which are rounded adjacent its vertical sides, an auto penthouse affixed to the body upon the top thereof, cushions interposed between the penthouse and the top adjacent the edges thereof in position to transmit the load upon the top in a direct line to the vertical sides of the body, and means for securing the cushions in such position.

J. WILLIS JACKSON.